2 Sheets—Sheet 1.
J. C. MENDENHALL.
Gate.
No. 224,100. Patented Feb. 3, 1880.
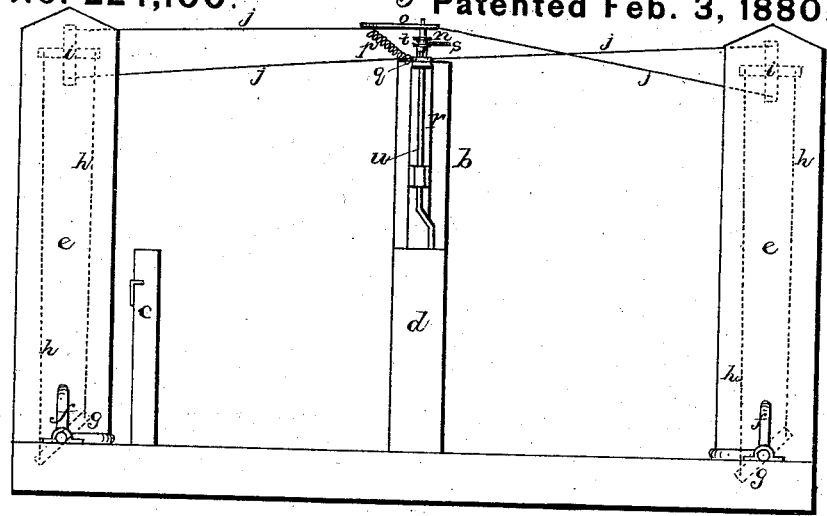
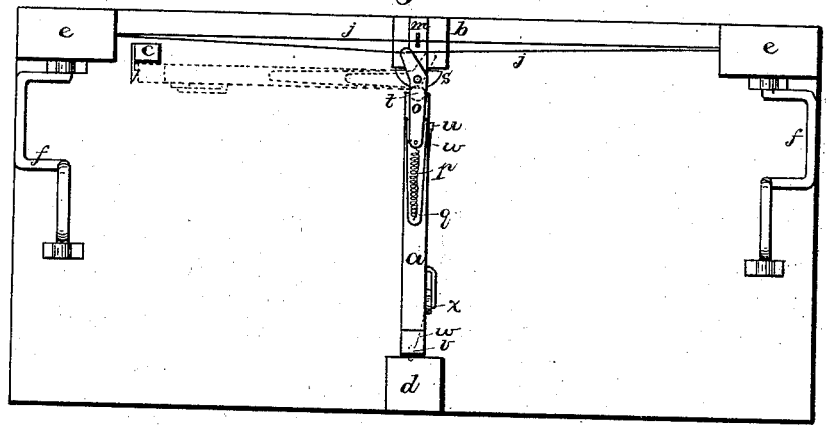
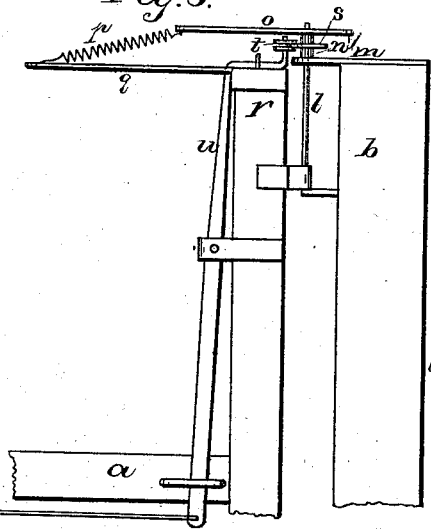
Witnesses:
J. W. Garner
Wm. W. Mortimer
Inventor:
J. C. Mendenhall,
per
F. A. Lehmann,
Atty.

2 Sheets—Sheet 2.
J. C. MENDENHALL.
Gate.
No. 224,100. Patented Feb. 3, 1880.
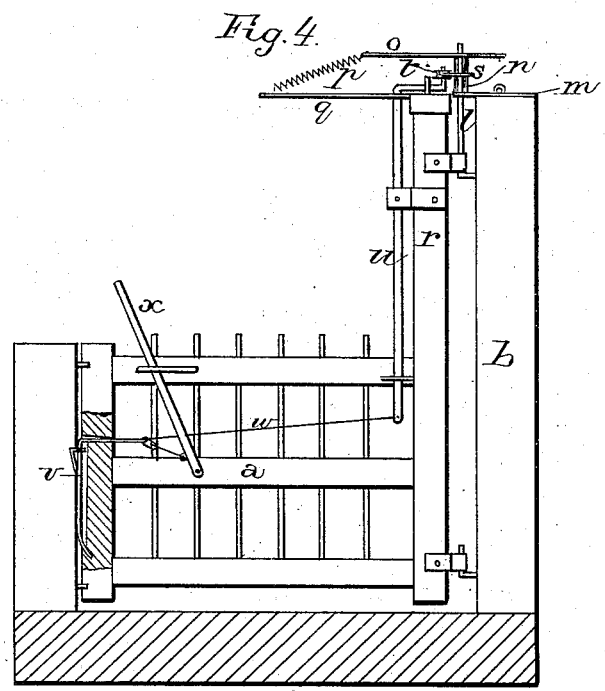

UNITED STATES PATENT OFFICE.

JUNIUS C. MENDENHALL, OF PLAINFIELD, INDIANA.

GATE.

SPECIFICATION forming part of Letters Patent No. 224,100, dated February 3, 1880.

Application filed October 31, 1879.

*To all whom it may concern:*

Be it known that I, JUNIUS C. MENDENHALL, of Plainfield, in the county of Hendricks and State of Indiana, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in self-opening and closing gates; and it consists in the arrangement and combination of parts that will be more fully described hereinafter, whereby a cheap, simple, and effective gate is produced.

Figure 1 is a side elevation of my invention. Fig. 2 is a plan view of the same. Fig. 3 is a detail view, and Fig. 4 is a side view of the gate as closed.

*a* represents the gate, which may be of any desired construction; *b*, the post upon which the gate is hinged; *d*, the post against which the gate latches, and *c* the post upon which the gate is held while open.

At a suitable distance beyond the gate, on both sides, is placed a double crank, *f*, for the wheels of the vehicle to strike against for opening and closing the gate, and each of these cranks has one of its ends to project inside of the hollow post *e*, where an arm, *g*, is secured to it. To each end of the arm is secured a wire or rope, *h*, which extends up to two of the ends of a double arm, *i*, which is pivoted in the top of the post. To the other two ends of the double arm are fastened the two wires *j*, which extend across over the top of the post *b* to the double arm in the other hollow post *e*.

The two posts *e* and the one *b* are made quite tall, so that the wires *j* will be raised high above the reach of all stock and maliciously-inclined persons.

Where the posts are low, stock are constantly getting their heads caught in the wires, and not only injuring the animals themselves, but breaking the mechanism of the gate.

That portion of the top hinge of the gate which is secured to the post *b* consists of the bent rod *l*, the top of which extends above the top of the post, and is braced in position by means of the plate *m*, which is secured to the post. Fitting down upon the top of this rod is a cap, *n*, which passes down through the brace-plate, and which has the lever *o* secured to its upper end. To the rear short end of the lever is secured one of the operating-wires *j*, and to the front end of the lever is fastened the spring *p*. The front end of the spring is attached to the lever *q*, which projects from the top of the post *r* of the gate, and serves to pull the gate suddenly open or shut.

The lever *o* begins to move some time before the mechanism for loosening the latch, and hence stretches the spring until the latch is moved, when the gate flies suddenly open or shut. The tension of this spring is so regulated that it exerts just enough pressure on the gate when it is stretched to throw the gate from one post to the other and cause the latch to catch. This spring does away with all need of inclining the gate to either side so as to cause it to swing open or shut.

Also, secured to the cap *n* is a cam, *s*, which bears against the side of a roller, *t*, on top of the lever *u*, which is pivoted to the inside of the post *r*. To the lower end of this lever is connected the latch *v* by means of a wire, *w*, so that when the cam, in turning with the cap, forces the upper end of the lever inward, the latch is drawn back so as to release the gate and allow the spring to throw it open or shut. Also, connected to the latch is the hand-lever *x*, so that the latch can be operated by persons on horseback without the trouble of dismounting.

Having thus described my invention, I claim—

The combination of the cranks *f*, having their inner ends extending into the posts *e*, and provided with the levers *g*, with the connections *h*, spiders *i*, located in the tops of the posts *e*, and wires *j*, whereby the wires are raised above the reach of animals, substantially as shown.

In testimony that I claim the foregoing I have hereunto set my hand this 27th day of October, 1879.

JUNIUS C. MENDENHALL.

Witnesses:
ELI JOHNSON,
N. M. FRAZER.